(12) United States Patent
Veit et al.

(10) Patent No.: US 6,230,696 B1
(45) Date of Patent: May 15, 2001

(54) INTERNAL COMBUSTION ENGINE, ESPECIALLY DIESEL-INTERNAL COMBUSTION ENGINE

(75) Inventors: Ulrich Veit; Gernot Graf; Gabor Hrauda, all of Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/399,024

(22) Filed: Sep. 17, 1999

(30) Foreign Application Priority Data

Sep. 18, 1998 (AT) .................................................. 614/98

(51) Int. Cl.$^7$ ................................................ F02M 25/07
(52) U.S. Cl. .................... 123/568.12; 123/568.2; 60/605.2
(58) Field of Search ................... 123/568.11, 568.12, 123/568.13, 568.2, 568.21; 60/605.2

(56) References Cited

U.S. PATENT DOCUMENTS

| | | | |
|---|---|---|---|
| 3,702,111 | * 11/1972 | Weaving et al. .................. | 123/568.2 |
| 4,156,414 | * 5/1979 | Kawamura et al. ............. | 123/568.12 |
| 4,192,265 | * 3/1980 | Amano et al. ..................... | 123/568.2 |
| 4,328,781 | * 5/1982 | Morita .............................. | 123/568.12 |
| 5,115,790 | * 5/1992 | Kawamura ........................ | 123/568.2 |
| 5,746,189 | * 5/1998 | Kuzuya et al. ................... | 123/568.2 |

* cited by examiner

Primary Examiner—Willis R. Wolfe
(74) Attorney, Agent, or Firm—Dykema Gossett PLLC

(57) ABSTRACT

An internal combustion engine, especially a diesel engine, with at least one combustion chamber, an intake system having at least one intake manifold, an exhaust system having at least one common exhaust line, and an exhaust gas recirculation system for reintroducing exhaust gas into the intake system, the exhaust gas recirculation system including at least one exhaust gas recirculation line with an exhaust gas recirculation valve the exhaust gas recirculation line branching off directly from the combustion chamber, the EGR valve being positioned preferably at the branch-off, in order to reduce Nox emissions and ensure good fuel economy.

13 Claims, 2 Drawing Sheets

INTERNAL COMBUSTION ENGINE, ESPECIALLY DIESEL-INTERNAL COMBUSTION ENGINE

BACKGROUND OF THE INVENTION

This invention relates to an internal combustion engine, especially a diesel engine, with at least one combustion chamber, and with an intake system having at least one intake manifold, and an exhaust system and an exhaust gas recirculation system for reintroducing exhaust gas into the intake system, the exhaust gas recirculation system having at least one exhaust gas recirculation line with an exhaust gas recirculation valve.

DESCRIPTION OF THE PRIOR ART

In order to meet ever stricter exhaust emission standards whilst further improving fuel economy in internal combustion engines, especially diesel engines, it has become established practice to add a certain amount of cooled exhaust gas to the fresh air drawn in by the engine. In this way the Nox emissions of an engine are reduced to the levels required by law and good fuel economy is ensured.

In charged diesel engines of commercial vehicles the mean pressure in the exhaust manifold—depending on engine size and speed—is smaller over a wide rpm and load range than on the intake side. With the use of only a connecting line between exhaust manifold and intake side no exhaust gas would reach the intake area of the cylinders.

SUMMARY OF THE INVENTION

It is an object of this invention to reduce the Nox emissions of an engine whilst ensuring good fuel economy in a simple manner.

This is achieved according to the invention by providing that the exhaust gas recirculation line branch off directly from the combustion chamber, the exhaust gas recirculation valve being positioned preferably at the branch-off. Via the EGR valve, which is small compared to the intake and exhaust valves and may be positioned in the combustion chamber top preferably constituted by the cylinder head, high-pressure exhaust gases may be withdrawn directly from the combustion chamber at the end of the high-pressure process. Preferably, the EGR valve is actuated electrically. Actuation may be effected by means of a solenoidal or piezoelectric actuating element. The EGR valve is operated via an electronic control independently of intake and exhaust valve timing.

It is further provided that the exhaust gas recirculation system have an exhaust gas collecting line, and that at least two exhaust gas recirculation lines departing from each combustion chamber open into the exhaust gas collecting line, which latter is connected to the intake system preferably via an exhaust gas recirculation cooler. If the EGR valve opens during the exhaust phase at 180° crank angle, for instance, the positive pressure difference prevailing at that moment between the combustion chamber and the intake system will cause exhaust gas to escape through the exhaust gas recirculation line into the exhaust gas collecting line, which may be placed outside the cylinder head, for example. This line collects the exhaust gas coming from each cylinder and opens into an exhaust gas recirculation cooler. Downstream of the exhaust gas recirculation cooler the exhaust gas is reintroduced into the intake system from where it will enter the cylinders once more. Depending on actual requirements, exhaust gas may be withdrawn from one cylinder, or some of the cylinders, or all cylinders.

In a preferred variant, actuation of the EGR valve is controlled in dependence of the engine characteristics. Both the number of withdrawals and the control times of the EGR valve are optimization criteria depending on the engine design. The free choice of the EGR valve opening times permits the system to be optimally controlled and matched to all operating modes in dependence of the characteristic map. In this manner optimum exhaust gas recirculation rates will be obtained yielding optimum mileage at road load and complying with even the strictest exhaust emission standards.

Special preference is given to a variant in which the exhaust gas recirculation system can be connected to the exhaust system by at least one connecting line, which latter branches off from the exhaust gas recirculation system preferably upstream of the exhaust gas recirculation cooler, and opens into the common exhaust line of the exhaust system preferably upstream of an exhaust gas turbine. Due to this connection between exhaust gas recirculation system and exhaust system the EGR valve can also act as an exhaust brake. It will be a special advantage in this context if a control element is included, preferably downstream of the exhaust gas collecting line, via which the exhaust gas collecting line can be flow connected with the exhaust gas recirculation system or the exhaust system. Via the control element, which may be configured as a flap, the exhaust gas may be introduced either into the exhaust gas recirculation cooler or, as an alternative, into the common exhaust line upstream of an exhaust gas turbine, in dependence of the operating mode (road load or deceleration).

Compared to known types of exhaust gas recirculation systems and separate exhaust brake systems the system of the invention uses up very little space.

BRIEF DESCRIPTION OF THE DRAWINGS

Following is a more detailed description of the invention as illustrated by the accompanying drawings, in which.

DETAILED DESCRIPTION OF PREFERRED EMBODIMENTS

Figure 1:
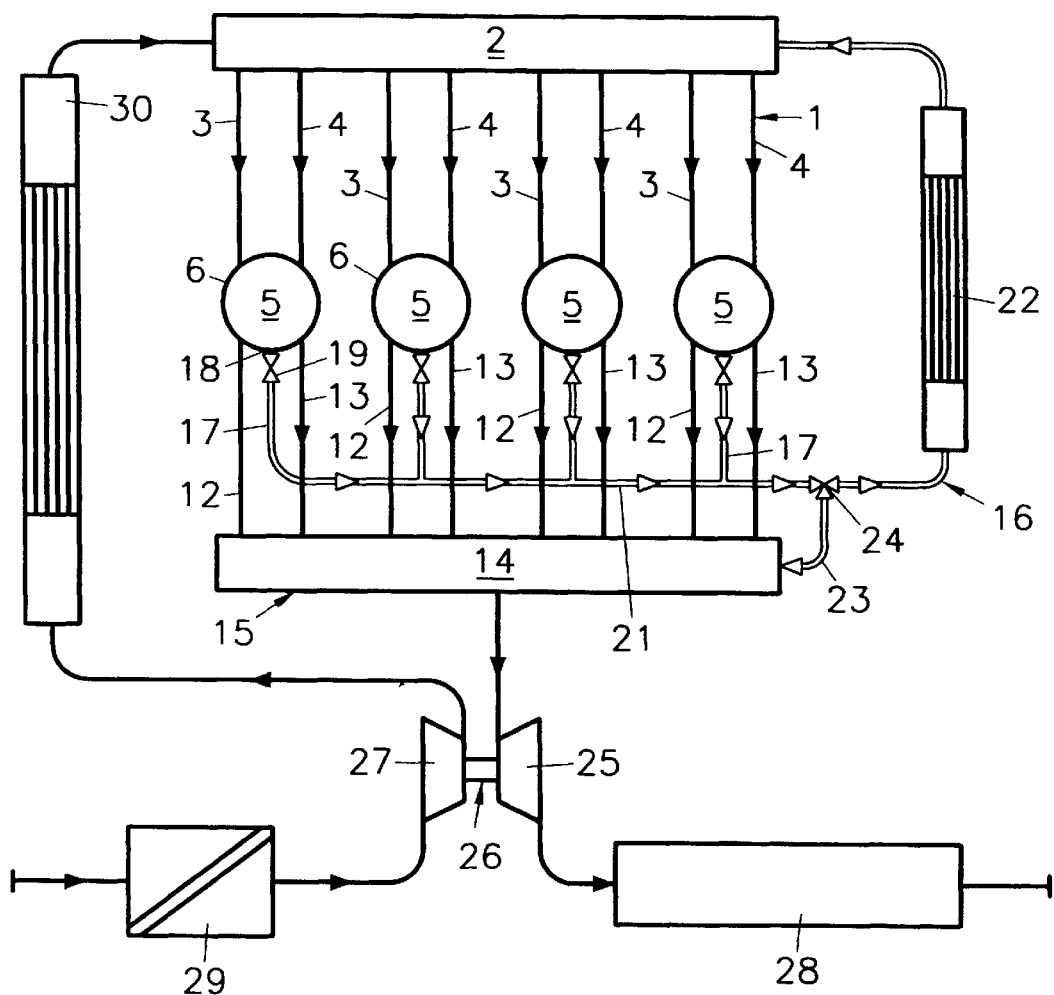
FIG. 1 is a schematical representation of an internal combustion engine according to the invention.

FIG. 1 is a schematical view of an internal combustion engine according to the invention, preferably a multi-cylinder engine. The engine has an intake system 1 with an intake manifold 2 connected by means of two intake ports 3, 4 per cylinder to the combustion chamber 5 of a cylinder 6. Via intake valves 7, 8 positioned in the cylinder head 9 the intake ports 3, 4 open into the combustion chamber 5 of the engine. As is shown in FIG. 2, the cylinder head 9 also includes two exhaust valves 10, 11 for each cylinder 6, by means of which the combustion chamber 5 can be connected to a common exhaust line 14 of an exhaust system 15.

The engine further includes an exhaust gas recirculation system 16 with at least one exhaust gas recirculation line 17 per cylinder branching off directly from the combustion chamber 5. At the branchoff 18 an exhaust gas recirculation (EGR) valve 19 is provided in the exhaust gas recirculation line 17.

Figure 2:
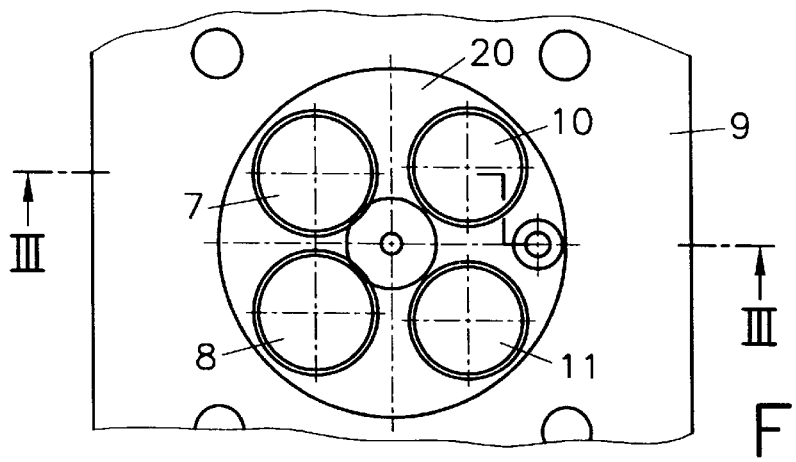
FIG. 2 shows a cylinder head of the engine from the side of the combustion chamber.
Figure 3:
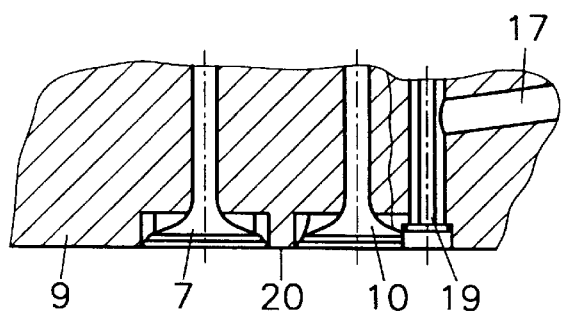
FIG. 3 shows the cylinder head in a section along line III—III in FIG. 2.
Figure 4:
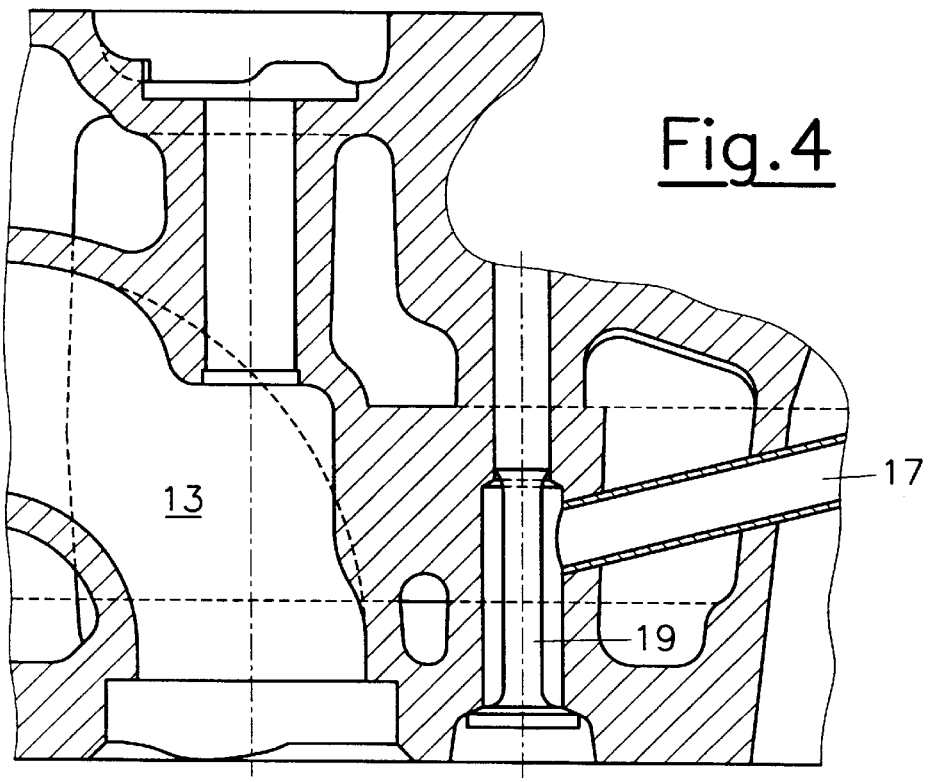
FIG. 4 shows a detailed sectional view of the cylinder head, the exhaust valve having been removed.

Along with intake valves 7, 8 and exhaust valves 10, 11 the EGR valve 19 is mounted in the combustion chamber top surface 20 formed by the cylinder head 9 (FIGS. 2–4). It is preferably configured as a lifting valve opening into the combustion chamber 5. The valve may be actuated mechanically, hydraulically or electrically. The exhaust gas recirculation system 16 is further provided with an exhaust gas collecting line 21, into which open the exhaust gas recirculation lines 17 coming from the combustion chambers 5. The exhaust gas collecting line 21 leads to an exhaust gas recirculation cooler 22, and further on back into the intake system 1, for example, into the intake manifold 2.

A most flexible control in dependence of the engine characteristics is obtained if the EGR valve 19 is actuated electrically, in particular, by piezoelectric or solenoidal actuators, such that exhaust gas recirculation can take place independently of the timing of exhaust valves 10, 11. If required, exhaust gas may be withdrawn from one cylinder or some of the cylinders only. The number of withdrawals as well as the timing of the EGR valve 19 are optimization criteria depending on the given requirements and on the engine design. As the opening times of the EGR valve 19 may be chosen freely optimum exhaust gas recirculation rates may be obtained to yield optimum mileage under road load and meet the strictest exhaust emission standards.

If the exhaust gas recirculation system 16 can be connected to the exhaust system 15 by a connecting line 23 upstream of the exhaust gas recirculation cooler 22, the EGR valve 19 can also be used as a throttle for engine braking. This is achieved by providing a control element 24 upstream of the common exhaust line 14 and downstream of the exhaust gas collecting line 21, which element 24 will introduce the exhaust gas into the exhaust gas recirculation cooler 22 or into the common exhaust line 14 upstream of the exhaust gas turbine 25 of the turbocharger 26, depending on the prevailing operating mode. From the turbocharger 26 the exhaust gas is passed on into the exhaust pipe 28 and from there into the open.

On its way into the intake manifold 2 the intake air passes through the air filter 29, the compressor 27 of the turbocharger 26 and the charge-air cooler 30.

Compared to previous systems the exhaust gas recirculation system with integrated engine brake described by the invention will require little space and offer good fuel economy whilst reducing Nox emissions in a simple manner.

What is claimed is:

1. An internal combustion engine including a cylinder defining a combustion chamber, an intake system having an intake manifold, an exhaust system having a common exhaust line, and an exhaust gas recirculation system for reintroducing exhaust gas into the intake system, said exhaust gas recirculation system comprising an exhaust gas recirculation line which branches off directly from the combustion chamber, an exhaust gas recirculation valve positioned at the branch-off, and a connecting line which branches off from the exhaust gas recirculation system and opens into the common exhaust line of the exhaust system.

2. An internal combustion engine according to claim 1, wherein the exhaust gas recirculation valve is positioned in a top surface of the combustion chamber formed by a cylinder head.

3. An internal combustion engine according to claim 1, wherein the exhaust gas recirculation valve is actuated electrically.

4. An internal combustion engine according to claim 1, wherein the exhaust gas recirculation valve is controlled in dependence on the engine characteristics.

5. An internal combustion engine according to claim 1, wherein the connecting line opens into the common exhaust line of the exhaust system upstream of an exhaust gas turbine.

6. An internal combustion engine according to claim 1, including a control element downstream of the exhaust gas collecting line for directing exhaust gas flow to the exhaust gas recirculation system or to the exhaust system.

7. An internal combustion engine according to claim 1, wherein said internal combustion engine is a diesel engine.

8. An internal combustion engine according to claim 1, wherein the exhaust gas recirculation system includes an exhaust gas collecting line.

9. An internal combustion engine according to claim 8, wherein the exhaust gas collecting line is connected to the intake manifold.

10. An internal combustion engine according to claim 8, wherein the exhaust gas collecting line is connected to the intake system via an exhaust gas recirculation cooler.

11. An internal combustion engine according to claim 10, wherein the connecting line branches off from the exhaust gas recirculation system upstream of the exhaust gas recirculation cooler.

12. An internal combustion engine according to claim 8, including a plurality of cylinders, each defining a combustion chamber, and a plurality of exhaust gas recirculation lines which respectively connect a respective combustion chamber to said exhaust gas collecting line.

13. An internal combustion engine according to claim 12, including at least two exhaust gas recirculation lines which extend from each combustion chamber to said exhaust gas collecting line, and wherein said exhaust gas collecting line extends to and connects with said intake system.

\* \* \* \* \*